United States Patent
George

(10) Patent No.: US 6,300,731 B1
(45) Date of Patent: Oct. 9, 2001

(54) DYNAMIC FOCUS VOLTAGE AMPLITUDE CONTROLLER

(75) Inventor: John Barrett George, Carmel, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/130,962

(22) Filed: Aug. 7, 1998

(51) Int. Cl.⁷ .................................................. G09G 1/04
(52) U.S. Cl. ........................................ 315/382; 315/382.1
(58) Field of Search ................................. 315/371, 382.1, 315/382, 369, 389

(56) References Cited

U.S. PATENT DOCUMENTS

| | | | |
|---|---|---|---|
| 4,318,033 | * 3/1982 | Eames, Jr. | 315/382 |
| 4,695,886 | * 9/1987 | Schofield | 348/682 |
| 4,916,365 | * 4/1990 | Arai | 315/383 |
| 4,968,919 | * 11/1990 | Oliver | 315/371 |
| 5,332,953 | 7/1994 | Hartman et al. | 315/382 |
| 5,412,290 | * 5/1995 | Helfrich | 315/371 |
| 5,463,288 | 10/1995 | George et al. | 315/382 |
| 5,754,250 | * 5/1998 | Cooper | 348/525 |
| 5,831,400 | * 11/1998 | Kim | 315/382.1 |
| 5,942,861 | * 8/1999 | Bang | 315/382 |
| 5,956,099 | * 9/1999 | Watanabe | 348/805 |

FOREIGN PATENT DOCUMENTS

| | | | |
|---|---|---|---|
| 63-208371 | 8/1988 | (JP) | H04N/3/26 |
| 3-91372 | 4/1991 | (JP) | H04N/3/26 |
| 3-159417 | 9/1991 | (JP) | H03K/4/04 |
| 5-75886 | 3/1993 | (JP) | H04N/3/26 |

OTHER PUBLICATIONS

Sokoloski, et al., "An automatic voltage control circuit" Feb. 1974, Review of Scientific Instruments vol. 45, No. 2, p. 295.*

*Chassis 445M/X 21" Colour Monitor Service Manual*, ZB1532, Salcomp Oy, PL 14, 24010 Salo, Finland, Nov. 1993, cover and pp. 14–15.

* cited by examiner

*Primary Examiner*—Seungsook Ham
*Assistant Examiner*—Shun Lee
(74) *Attorney, Agent, or Firm*—Joseph S. Tripoli; Harvey D. Fried; Sammy S. Henig

(57) ABSTRACT

A resistive voltage divider is responsive to a parabolic voltage developed in an S-shaping capacitor of a deflection circuit operating at a selected deflection frequency. The voltage divider includes a controllable resistive network for automatically selecting an attenuation factor of the voltage divider in accordance with the selected deflection frequency. An amplifier responsive to the attenuated parabolic voltage generates at an output terminal of the amplifier a periodic output voltage that is capacitively coupled to a focus electrode to produce a dynamic focus voltage. In a first embodiment, the controllable resistive network includes a photoresistor that provides automatic gain control. In an alternative, second embodiment, the voltage divider is switched.

10 Claims, 3 Drawing Sheets

DYNAMIC FOCUS VOLTAGE AMPLITUDE CONTROLLER

BACKGROUND

An image displayed on a cathode ray tube (CRT) may suffer from imperfections or distortions such as defocusing or nonlinearity that is incident to the scanning of the beam on the CRT. Such imperfections or distortions occur because the distance from the electron gun of the CRT to the faceplate varies markedly as the beam is deflected, for example, in the horizontal direction. Reducing the defocusing that occurs as the beam is deflected in the horizontal direction, for example, may be obtained by developing a dynamic focus voltage having a parabolic voltage component at the horizontal rate and applying the dynamic focus voltage to a focus electrode of the CRT for dynamically varying the focus voltage. It is known to derive the parabolic voltage component at the horizontal rate from an S-correction voltage developed in an S-shaping capacitor of a horizontal deflection output stage.

A television receiver, computer or monitor may have the capability of selectively displaying picture information in the same CRT using a deflection current at different horizontal scan frequencies. When displaying the picture information of a television signal defined according to a broadcasting standard, it may be more economical to utilize a horizontal deflection current at a rate of approximately 16 KHz, referred to as the $1f_H$ rate. Whereas, when displaying the picture information of a high definition television signal or a display monitor data signal, the rate of the horizontal deflection current may be equal to or greater than 32 KHz. The higher rate is referred to as $2nf_H$. The value n is equal to or greater than 1.

In the horizontal deflection circuit output stage of a video display monitor capable of operating at multi-scan rates, it is known to vary the number of in-circuit S-capacitors using switched S-capacitors. The selection of the S-capacitors is made automatically via selectable switches, in accordance with the selected horizontal deflection frequency.

When a non-switched retrace capacitor is employed, the length of the horizontal retrace interval is the same at different horizontal frequencies. As a result, the required amplitudes of the S-correction voltage at the different frequencies may be different. Whereas, the required amplitudes of the parabolic voltage component of the dynamic focus voltage may need be the same. Therefore, it may be desirable to control the amplitudes of the parabolic voltage component of the dynamic focus voltage at the different horizontal frequencies separately from the way the amplitudes of the S-correction voltage are controlled.

In carrying out an inventive feature, a parabolic horizontal rate voltage is developed in the S-shaping capacitor. The parabolic voltage is attenuated through a controlled variable voltage divider. The output of the voltage divider is coupled to an input of a differential amplifier that compares and adjusts the peak-to-peak amplitude of the parabolic voltage to be equal to a voltage reference. Adjusting the peak-to-peak amplitude is done by controlling the resistance of a photo resistor of the controlled variable voltage divider. The attenuated parabolic voltage is amplified in a high voltage amplifier. Thereby, the attenuation varies to control the amplitudes of the parabolic voltage component of the dynamic focus voltage at different horizontal frequencies.

In carrying out another inventive feature, the parabolic voltage is attenuated, instead, through a voltage divider coupled to a switch and the attenuated parabolic voltage is amplified in the high voltage amplifier. The switch of the attenuator responds to a switching control signal that is indicative of the selected horizontal frequency. Thereby, the attenuation varies to control the amplitudes of the parabolic voltage component of the dynamic focus voltage at different horizontal frequencies.

A video imaging apparatus, embodying an inventive feature, includes a source of a first parabolic signal at a frequency related to a deflection frequency, selected from a plurality of frequencies. The first parabolic signal has an amplitude determined in accordance with the selected frequency. A voltage divider including a resistor has an input coupled to the source of the first parabolic signal to generate an attenuated parabolic signal having an amplitude in accordance with a value of the resistor. A control circuit, responsive to a control signal that is indicative of the first parabolic signal amplitude, is coupled to the resistor for varying the value of the resistor, in accordance with the control signal. An amplifier responsive to the attenuated parabolic signal and coupled to the focus electrode amplifies the attenuated parabolic signal to generate a dynamic focus voltage at the focus electrode.

DESCRIPTION OF THE PREFERRED EMBODIMENTS

Figure 1A:
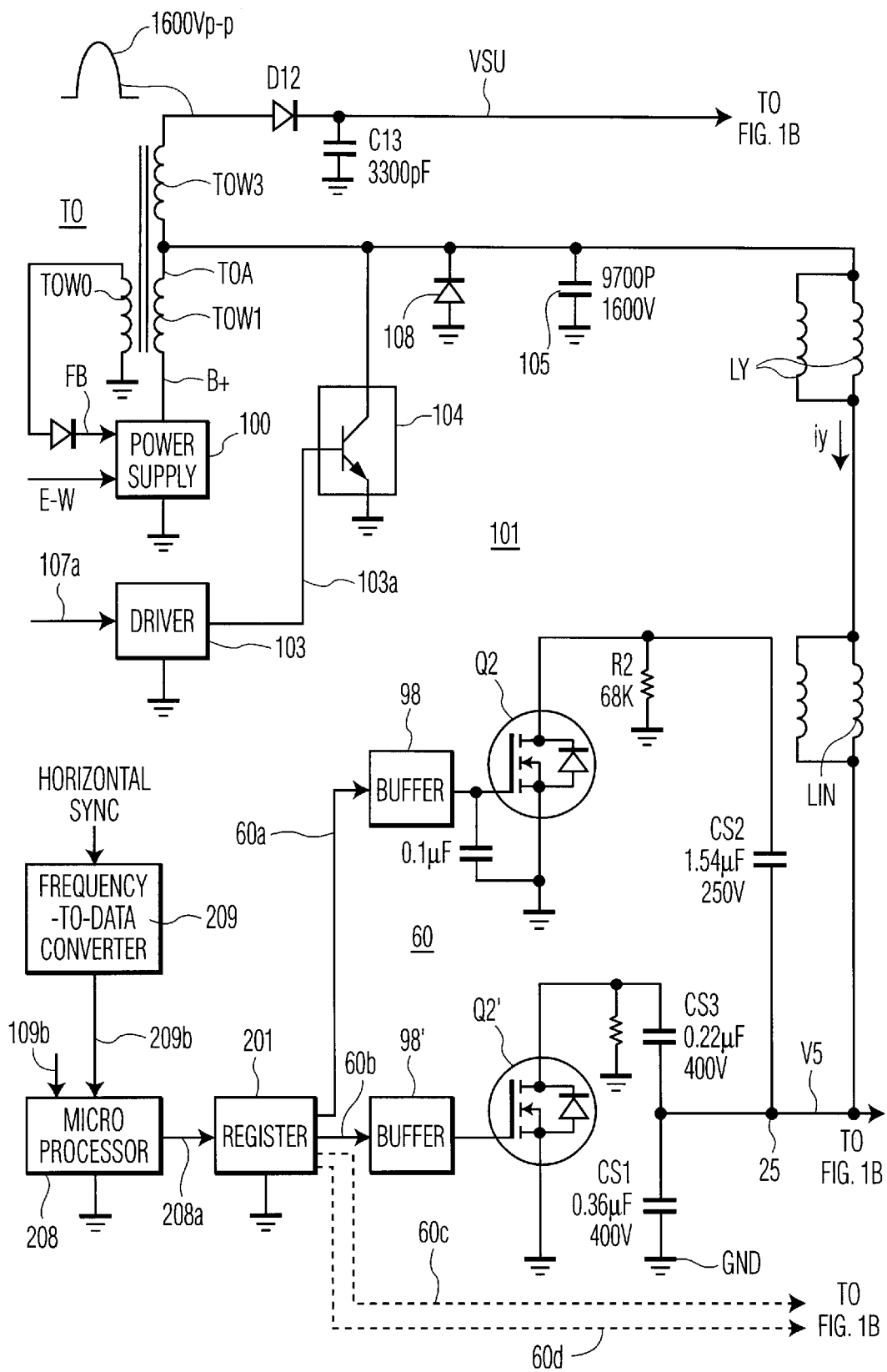
FIGS. 1A and 1B illustrate a horizontal deflection circuit output stage and a dynamic focus voltage generator including a controlled attenuator, in accordance with an inventive feature.

FIG. 1A illustrates a horizontal deflection circuit output stage 101 of a television receiver having multi-scan frequency capability. Stage 101 is energized by a regulated power supply 100 that generates a supply voltage B+. A conventional driver stage 103 is responsive to an input signal 107a at the selected horizontal scanning frequency $nf_H$. Driver stage 103 generates a drive control signal 103a to control the switching operation in a switching transistor 104 of output stage 101. By way of example, a value of n=1 may represent the horizontal frequency of a television signal according to a given standard such as a broadcasting standard. The collector of transistor 104 is coupled to a terminal T0A of a primary winding T0W1 of a flyback transformer T0. The collector of transistor 104 is also coupled to a non-switched retrace capacitor 105. The collector of transistor 104 is additionally coupled to a horizontal deflection winding LY to form a retrace resonant circuit. The collector of transistor 104 is also coupled to a conventional damper diode 108. Winding LY is coupled in series with a linearity inductor LIN and a non-switched trace or S-capacitor CS1. Capacitor CS1 is coupled between a terminal 25 and a reference potential, or ground GND such that terminal 25 is interposed between inductor LIN and S-capacitor CS1.

Output stage 101 is capable of producing a deflection current iy. Deflection current iy has substantially the same predetermined amplitude for any selected horizontal scan frequency of signal 103a selected from a range of $2f_H$ to $2.4f_H$ and for a selected horizontal frequency of $1f_H$. Controlling the amplitude of deflection current iy is accomplished by automatically increasing voltage B+ when the horizontal frequency increases, and vice versa, so as to maintain constant amplitude of deflection current iy. Voltage B+ is controlled by a conventional regulated power supply 100 operating in a closed-loop configuration via a feedback winding T0W0 of transformer T0. The magnitude of voltage B+ is established, in accordance with a rectified, feedback flyback pulse signal FB having a magnitude that is indicative of the amplitude of current iy. A vertical rate parabola signal E-W is generated in a conventional way, not shown. Signal E-W is conventionally coupled to power supply 100 for producing a vertical rate parabola component of voltage B+ to provide for East-West distortion correction.

A switching circuit 60 is used for correcting a beam landing error such as linearity. Circuit 60 selectively couples none, only one or both of a trace or S-capacitor CS2 and a trace or S-capacitor CS3 in parallel with trace capacitor CS1. The selective coupling is determined as a function of the range of frequencies from which the horizontal scan frequency is selected. In switching circuit 60, capacitor CS2 is coupled between terminal 25 and a drain electrode of a field effect transistor (FET) switch Q2. A source electrode of transistor Q2 is coupled to ground GND. A protection resistor R2 that prevents excessive voltage across transistor Q2 is coupled across transistor Q2.

A register 201 applies switch control signals 60a and 60b. Control signal 60a is coupled via a buffer 98 to a gate electrode of transistor Q2. When control signal 60a is at a first selectable level, transistor Q2 is turned off. On the other hand, when control signal 60a is at a second selectable level, transistor Q2 is turned on. Buffer 98 provides the required level shifting of signal 60a to accomplish the above mentioned switching operation, in a conventional manner.

In switching circuit 60, capacitor CS3 is coupled between terminal 25 and a drain electrode of a FET switch Q2'. FET switch Q2' is controlled by control signal 60b in a similar way that FET switch Q2 is controlled by control signal 60a. Thus, a buffer 98' performs a similar function as buffer 98.

A microprocessor 208 is responsive to a data signal 209b generated in a frequency-to-data signal converter 209. Signal 209b has a numerical value that is indicative of the frequency of a synchronizing signal HORZ-SYNC or deflection current iy. Converter 209 includes, for example, a counter that counts the number of clock pulses, during a given period of signal HORZ-SYNC and generates word signal 209b in accordance with the number of clock pulses that occur in the given period. Microprocessor 208 generates a control data signal 208a that is coupled to an input of register 201. The value of signal 208a is determined in accordance with the horizontal rate of signal HORZ-SYNC. Register 201 generates, in accordance with data signal 208a, control signals 60a and 60b at levels determined by signal 208a, in accordance with the frequency of signal HORZ-SYNC. Alternatively, the value of signal 208a may be determined by a signal 109b that is provided by a keyboard, not shown.

When the frequency of horizontal deflection current iy is $1f_H$, transistors Q2 and Q2' are turned on. The result is that both S-capacitors CS2 and CS3 are in-circuit S-capacitors that are coupled in parallel with non-switched S-capacitor CS1 and establish a maximum S-capacitance value. When the frequency of horizontal deflection current iy is equal to or greater than $2 f_H$ and less than $2.14 f_H$, transistor Q2 is turned off and transistor Q2' is turned on. The result is that S-capacitor CS2 is decoupled from non-switched S-capacitor CS1 and S-capacitor CS3 is coupled to S-capacitor CS1 to establish an intermediate S-capacitance value. When the frequency of horizontal deflection current iy is equal to or greater than $2.14 f_H$, transistors Q2 and Q2' are turned off. The result is that S-capacitors CS2 and CS3 are decoupled from non-switched S-capacitor CS1 and establish a minimum S-capacitance value. Deflection current iy in capacitor CS1, CS2 or CS3 produces an S-shaping parabolic voltage V5.

The total retrace capacitance formed by capacitor 105 does not change at the different scan frequencies. Therefore, the retrace interval has the same length at the different scan frequencies. The values of capacitors CS1, CS2 and CS3 are selected to produce parabolic voltage V5 at different amplitudes at different scan frequencies. The different amplitudes of voltage V5 are required because the retrace interval length is constant.

Figure 1B:
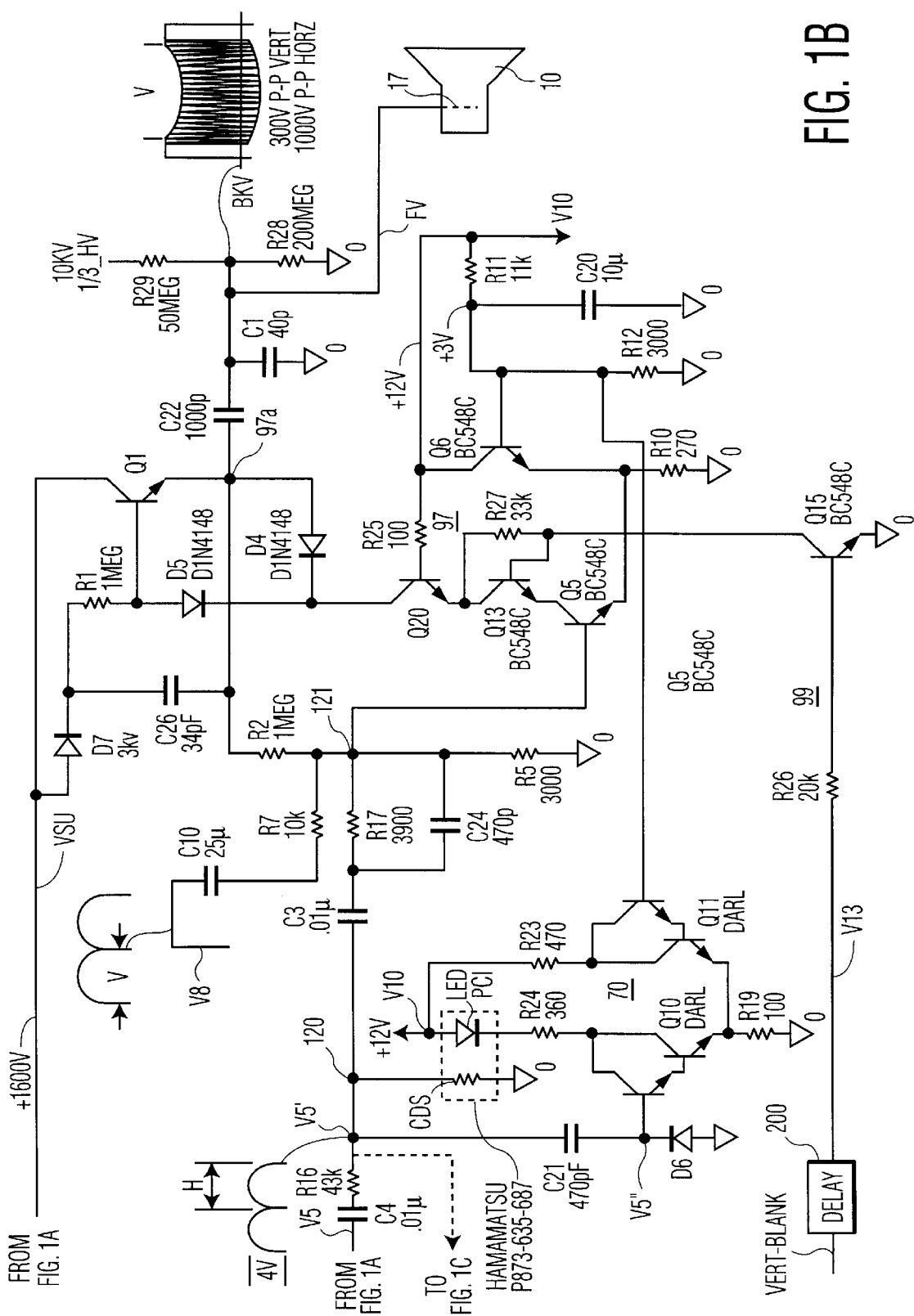

FIG. 1B illustrates a dynamic focus voltage generator 99, embodying an inventive feature. Similar symbols and numerals in FIGS. 1A and 1B indicates similar items or functions. Voltage V5 of FIG. 1B has negative going retrace peaks. The peak to peak amplitude of parabolic voltage V5 is about 60V at 16 KHz or $1f_H$, 80V at $2f_H$ and 125V at $2.4f_H$. Parabola voltage V5 is capacitively coupled via a capacitor C4 to a resistor R16.

A controlled voltage divider or attenuator 70 that includes resistor R16 and a resistor CDS develops an attenuated parabolic voltage V5' at a terminal 120. The attenuation of voltage divider 70 is determined by the state of conduction of cadmium sulfide photo resistor CDS that is a part of a photo-coupler PC1. Photo resistor CDS is responsive to light from a light emitting diode LED that is part of photo coupler PC1. The light from diode LED is responsive to a current from a darlington transistor Q10. Darlington transistor Q10 and a darlington transistor Q11 are coupled to each other and to a resistor R19, a resistor R23 and a resistor R24 to form a differential amplifier. The base of Darlington transistor Q11 is coupled to a constant reference voltage of 3 volts derived from a 12V supply via resistive divider formed by a resistor R11 and a resistor R12.

The DC component of voltage V5' is near 0 volts. The AC component is determined by resistors R16 and CDS and a resistor R17. The value of resistor CDS is determined by the light energy from light emitting diode LED. The AC component of voltage V5', a voltage V5", is coupled through a capacitor C21 to the base of Darlington transistor Q10 and to the cathode of a clamping diode D6. The negative peak of voltage V5" is held at −0.6 volts by clamping diode D6. The positive peak of voltage V5" will turn on Darlington transistor Q10 when the level of +3 volts at the base of Darlington transistor Q11 is exceeded. When Darlington transistor Q10 turns on, current flows through diode LED and light flux is produced. This light flux acts on resistor CDS so as to reduce its resistive value, the amplitude of voltage V5' and the amplitude of voltage V5". The speed of response of the change of the resistive value of resistor CDS is very slow. This acts as a low pass filter in the negative feedback loop. As the positive peak value of V5" lowers to +3V, the on time of transistor Q10 shortens and the average light energy from diode LED decreases until a balance is established. The positive peak amplitude of voltage V5" is then maintained at slightly greater than +3 volts. The peak-to-peak amplitude of voltages V5" and V5' is maintained at about 4 volts independent of input frequency or amplitude.

Drive voltage V5', developed at junction terminal 120 of resistors CDS and R16, is capacitively coupled through a capacitor C23, a resistor R17 and a capacitor C24 to a summing junction input terminal 121 of a focus amplifier 97. The gain control action of resistor CDS regulates the voltage at terminal 121 to have equal peak-to-peak amplitude at each of the $1f_H$, $2f_H$ and $2.4f_H$ rates.

Capacitor C23 provides capacitive coupling for the horizontal parabola. A capacitor C10 capacitively couples a vertical parabola V8, produced in a conventional manner, not shown, to terminal 121. The direct current operating point of focus amplifier 97 is determined by a resistor R5 and not by the parabolic signals, because the capacitive coupling eliminates a direct current component. Capacitor C24 corrects a phase delay caused by a stray input capacitance, not shown, of amplifier 97 so that the horizontal focus correction is properly timed.

In amplifier 97, a transistor Q5 and a transistor Q6 are coupled to each other to form a differential input stage. These transistors have very high collector current-to-base current ratio, referred to as beta, to increase the input impedance at terminal 121. The base-emitter junction voltages of transistors Q5 and Q6 compensate each other and reduce direct current bias drift with temperature changes. Resistor R11 and resistor R12 form a voltage divider that is applied to a supply voltage V10 at +12V for biasing the base voltage of transistor Q6 at about +3V. The value of an emitter resistor R10 that is coupled to the emitters of transistors Q5 and Q6 is selected to conduct a maximum current of about 6 mA. This protects a high voltage transistor Q20. Transistor Q20 is coupled to transistor Q5 via a transistor Q13 operating as a switch. Transistor Q20 is coupled to transistor Q5 via transistor Q13 in a cascode configuration. Transistor Q20 needs to be protected from being over-driven because transistor Q20 can tolerate only up to 10 mA collector current. This is accomplished because amplifier 97 has high transconductance at a collector current of up to 6 mA and lower transconductance above 6 mA. The cascode configuration of transistors Q20, Q13 and Q5 isolates the Miller capacitance, not shown, across the collector-base junction of transistor Q20, thereby the bandwidth is increased. The cascode configuration also makes the amplifier gain independent of the low beta of high voltage transistor Q20.

A winding T0W3 of transformer T0 of FIG. 1A produces a stepped-up retrace voltage that is rectified in a diode D12 and filtered in a capacitor C13 to produce a supply voltage VSU for energizing dynamic focus voltage generator 99 of FIG. 1B. An active pull up transistor Q1 has a collector coupled to supply voltage VSU. A base pull-up resistor R1 of transistor Q1 is coupled to voltage VSU via a bootstrap or boosting arrangement that includes a diode D7 and a capacitor C26. A diode D5 is coupled in series with resistor R1 and is coupled to the collector of transistor Q20. A diode D4 is coupled between the emitter of transistor Q1 at terminal 97a and the collector of transistor Q20.

During the negative peaks of the output waveform at terminal 97a, diode D7 clamps an end terminal of capacitor C26 at the cathode of diode D7 to the +1600V supply voltage VSU and transistor Q20 pulls the other end terminal of capacitor C16 to near ground potential. Transistor Q1 is held off by the actions of diodes D4 and D5. As the voltage at terminal 97a rises, the energy stored in capacitor C26 is fed through resistor R1 to the base of transistor Q1. The voltage across resistor R1 is maintained high, and base current in transistor Q1 also is maintained, even as the collector-to-emitter voltage across transistor Q1 approaches zero. Therefore, transistor Q1 emitter current is maintained. The output positive peak at terminal 97a can then be very near the +1600V supply voltage VSU without distortion.

A capacitance C1 represents the sum of the stray capacitance of focus electrode 17 and of the wiring. Active pull-up transistor Q1 is capable of sourcing a current from terminal 97a to charge stray capacitance C1. Pull-down transistor Q20 is capable of sinking current via diode D4 from capacitance C1. Advantageously, the active pull up arrangement is used to obtain fast response time with lowered power dissipation. Amplifier 97 uses shunt feedback for the output at terminal 97a via a feedback resistor R2. Resistors R17 and R2 are selected to produce 1000V horizontal rate voltage at terminal 97a. As a result, the voltage gain of amplifier 97 is several hundred.

Dynamic focus voltage components at the horizontal rate produced by voltage V5 and at the vertical rate produced by voltage V8 are capacitively coupled via a direct current blocking capacitor C22 to a focus electrode 17 of a CRT 10 to develop a dynamic focus voltage FV. A direct current voltage component of voltage FV, developed by a voltage divider formed by a resistor R28 and a resistor R29, is equal to 8KV.

A periodic control signal V13 is at a HIGH state, during vertical blanking and during, for example, four video line time that follow the vertical blanking, referred to as the AKB measurement interval, not shown. Signal V13 is produced by a delay circuit 200 that delays a conventional vertical blanking signal VERT-BLANK by a suitable number of video line times such as four. Signal V13 is coupled via a resistor R26 to the base of a switch transistor Q15. The collector of transistor Q15 is coupled via a resistor R27 to a junction terminal between the emitter of transistor Q20 and the collector of transistor Q13. The collector of transistor Q13 is coupled to the emitter of transistor Q20 and the emitter of transistor Q13 is coupled to the collector of transistor Q5. During vertical blanking and during the AKB measurement interval, transistor Q13 is turned off by transistor Q15 and blocks the flow of current from the collector of transistor Q5 to the emitter of transistor Q20.

Advantageously, emitter current for Q20 is maintained during the AKB measurement interval via resistor R27 and transistor Q15. Resistor R27 is coupled between the emitter of transistor Q20 and ground during the AKB measurement interval. During the AKB measurement interval, resistor R27 has across it a constant voltage of about 11.3 volts. The value of resistor R27 is chosen to cause a constant current in transistor Q20 such that a voltage developed across resistor R1 is equal to the difference between supply voltage VSU and the peak value of the dynamic focus voltage at terminal 97a. This eliminates an undesired focus voltage transient and first video line misfocusing that could otherwise occur when the normal dynamic focus voltage starts after the AKB measurement interval. If resistor R27 were not coupled to the emitter of transistor Q20, amplifier 97 output voltage at terminal 97a would tend to reach the +1600V level of supply voltage VSU. However, the required peak of the waveform at terminal 97a is typically 1450V. If the amplifier output voltage at terminal 97a were to become 1600V, during the AKB measurement interval, a large transient would have occurred at the start of the first visible horizontal line, at the top of the picture. The transient, disadvantageously, would have caused the beginning portion of the first visible horizontal line, that occurs following the AKB measurement interval, to be defocused.

To prevent such large transient, the current in transistor Q15, which provides current path to transistor Q20 through resistor R27, decreases the output voltage at terminal 97a, during vertical blanking and during the AKB measurement interval. Transistor Q20 acts as a current source and causes a voltage drop across resistor R1. During the AKB measurement interval, the dynamic focus voltage at terminal 97a is set to a level approximately equal to the peak of the summed horizontal and vertical parabolic components. Thereby, advantageously, focus voltage transient is significantly reduced, following the AKB measurement interval.

Figure 1C:
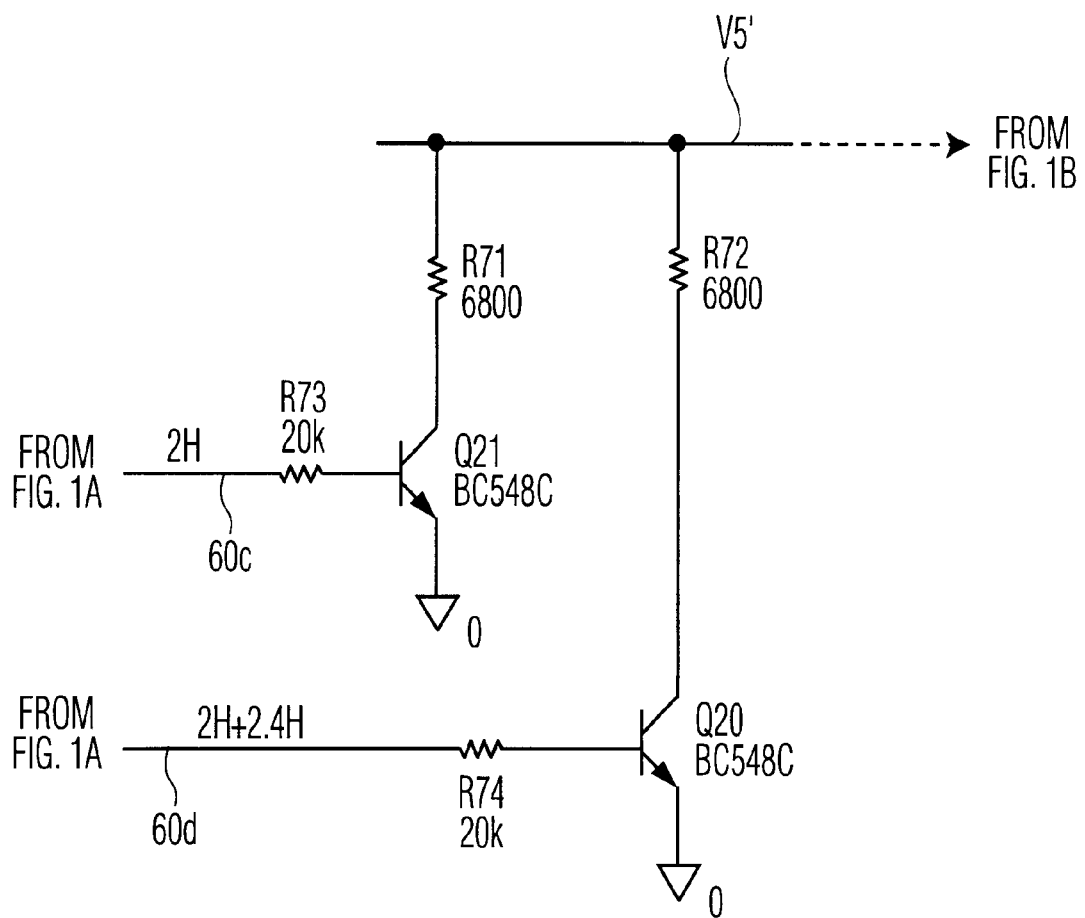
FIG. 1C illustrates an alternative for the attenuator of FIG. 1B, in accordance with an inventive feature.

FIG. 1C illustrates a switched attenuator 70' that may be used in the arrangement of FIG. 1B instead of non-switched attenuator 70. Similar symbols and numerals in FIGS. 1A, 1B and 1C indicate similar items or functions.

Attenuator 70' of FIG. 1C includes a resistor R71, and a resistor R72 that form with resistor R16 of FIG. 1B a controllable voltage divider. The attenuation of the voltage divider is determined by the state of conduction of a switch transistor Q20 that is coupled to resistor R72 and of a switch transistor Q21 that is coupled to resistor R71. Transistors Q21 and Q20 are controlled by a control signal 60c and a control signal 60d, respectively. Control signals 60c and 60d are generated in register 201 of FIG. 1A in a similar way to control signals 60a and 60b. Control signal 60c of FIG. 1C is at a HIGH state only when the frequency is equal to $2.4f_H$. Control signal 60d is at a HIGH state when the frequency is equal to or greater than $2f_H$. Both signals 60c and 60d are at the LOW state when the frequency is equal to $1f_H$.

When signal 60c or 60d is at the HIGH state, transistor Q21 or Q20, respectively, conducts. There is no attenuation when both transistors Q20 and Q21 are turned off, that occurs when the frequency is equal to $1f_H$. There is an intermediate attenuation when transistor Q20 is conducting and transistor Q21 is turned off, that occurs when the frequency is equal to $2f_H$. There is a maximum attenuation when both transistors Q20 and Q21 are conductive, that occurs when the frequency is equal to $2.4f_H$.

The values of resistors R16, R71 and R72 are chosen so that the voltage at terminal 121 has equal peak-to-peak amplitude at each of the $1f_H$, $2f_H$ and $2.4f_H$ rates. The selection criteria of resistors R16, R71 and R72 is aimed at equalizing the horizontal parabola focus correction amplitudes at output terminal 97a of focus amplifier 97 at each of the $1f_H$, $2f_H$ and $2.4f_H$ rates. In the arrangement of FIG. 1C, unlike in FIG. 1B, the value of resistor R16 is equal to 56KΩ.

What is claimed is:

1. A video imaging apparatus, comprising:
   a cathode-ray tube including a focus electrode;
   a source of a first parabolic signal at a frequency related to a deflection frequency, selected from a plurality of frequencies, having an amplitude determined in accordance with the selected frequency;
   a voltage divider including a first resistor, having an input coupled to said source of said first parabolic signal, for generating an attenuated parabolic signal having an amplitude in accordance with a value of said first resistor;
   a control circuit responsive to a control signal that is indicative of said first parabolic signal amplitude and coupled to said first resistor for varying said value of said first resistor, in accordance with said control signal; and
   an amplifier responsive to said attenuated parabolic signal and coupled to said focus electrode for amplifying said attenuated parabolic signal to generate a dynamic focus voltage at said focus electrode.

2. A video imaging apparatus according to claim 1, further comprising an amplifier responsive to said attenuated parabolic signal to control automatically said attenuated parabolic signal in a negative feedback manner.

3. A video imaging apparatus according to claim 1 wherein said first resistor comprises a photo-resistor.

4. A video imaging apparatus according to claim 1 wherein said first parabolic signal is developed in an S-shaping capacitor and is capacitively coupled to said voltage divider.

5. A video imaging apparatus, comprising:
   a cathode-ray tube including a focus electrode;
   a source of a parabolic signal at a frequency related to a deflection frequency, selected from a plurality of frequencies, having an amplitude determined in accordance with the selected frequency;
   a controllable switch responsive to a signal that is indicative of the frequency of said parabolic voltage having a first state when a first frequency is selected and a second state when a second frequency is selected;
   a voltage divider including a resistor coupled to said switch for selecting said resistor, when said first frequency is selected and for de-selecting said resistor, when said second frequency is selected to produce an attenuated parabolic signal such that an attenuation of said voltage divider is determined in accordance with the state of said switch; and
   an amplifier responsive to said attenuated signal voltage and coupled to said focus electrode for amplifying said attenuated parabolic voltage to generate a dynamic focus voltage at said focus electrode.

6. A video imaging apparatus, comprising:
   a cathode-ray tube including a focus electrode;
   a source of a first parabolic signal at a frequency related to a deflection frequency, selected from a plurality of frequencies, having an amplitude determined in accordance with the selected frequency;
   a voltage divider including a first impedance, having an input coupled to said source of said first parabolic signal, for generating a voltage divided parabolic signal having an amplitude in accordance with a value of said first impedance; and
   a control circuit responsive to said voltage divided parabolic signal and coupled to said first impedance for varying said value of said first impedance, in accordance with said voltage divided parabolic signal, in a negative feedback manner, said voltage divided parabolic signal being coupled to said focus electrode for developing a dynamic focus voltage at said focus electrode.

7. A video imaging apparatus, comprising:
   a cathode-ray tube including a focus electrode;
   a source of a first parabolic signal at a frequency related to a deflection frequency, selected from a plurality of frequencies, having an amplitude determined in accordance with the selected frequency;
   a voltage divider including a first impedance, having an input coupled to said source of said first parabolic signal, for generating a voltage divided parabolic signal having an amplitude in accordance with a value of said first impedance, said voltage divider parabolic signal being coupled to said focus electrode for developing a dynamic focus voltage at said focus electrode; and
   a control circuit responsive to said first parabolic signal and coupled to said first impedance for varying said value of said first impedance, in accordance with said first parabolic control signal, to regulate an amplitude of said dynamic focus voltage at each selected deflection frequency.

8. A video imaging apparatus, comprising:
   a cathode-ray tube including a focus electrode;

a source of a first parabolic signal at a frequency related to a deflection frequency, selected from a plurality of frequencies, having an amplitude determined in accordance with the selected frequency;

a voltage divider including first and second resistors, having an input coupled to said source of said first parabolic signal, for generating an attenuated parabolic signal having an amplitude in accordance with a value of said first resistor;

a control circuit responsive to a control signal that is indicative of said first parabolic signal amplitude and coupled to said first resistor for varying said value of said first resistor, in accordance with said control signal, said control circuit comprising an amplifier responsive to said parabolic signal for adjusting a ratio between said first and second resistors, in accordance with a magnitude of said first parabolic signal; and, an amplifier responsive to said attenuated parabolic signal and coupled to said focus electrode for amplifying said attenuated parabolic signal to generate a dynamic focus voltage at said focus electrode.

9. An apparatus according to claim 7 wherein said voltage divided parabolic signal is coupled to said first impedance in a feedback manner for varying said value of said first impedance in accordance with an amplitude of said voltage divided parabolic signal.

10. An apparatus according to claim 7 wherein said value of said first impedance varies in a continuous, non switched manner.

* * * * *